(12) United States Patent
Ai et al.

(10) Patent No.: US 7,070,530 B2
(45) Date of Patent: Jul. 4, 2006

(54) METHOD AND APPARATUS FOR POWER FLOW MANAGEMENT IN ELECTRO-MECHANICAL TRANSMISSIONS

(75) Inventors: Xiaolan Ai, Massilon, OH (US); Scott Anderson, Palos Hills, IL (US)

(73) Assignee: The Timken Company, Canton, OH (US)

( * ) Notice: Subject to any disclaimer, the term of this patent is extended or adjusted under 35 U.S.C. 154(b) by 344 days.

(21) Appl. No.: 10/648,079

(22) Filed: Aug. 26, 2003

(65) Prior Publication Data

US 2005/0049100 A1 Mar. 3, 2005
US 2006/0111212 A9 Mar. 3, 2005

(51) Int. Cl.
  *F16H 35/02* (2006.01)
  *F16H 3/72* (2006.01)
  *B60K 41/02* (2006.01)
  *G06F 17/00* (2006.01)

(52) U.S. Cl. .............. 475/5; 475/257; 477/17; 701/53; 290/1 C; 290/4 C

(58) Field of Classification Search .......... 475/3–5, 475/257, 270, 317; 477/3–9, 15, 17; 701/22, 701/51, 53; 290/1 C, 4 C
See application file for complete search history.

(56) References Cited

U.S. PATENT DOCUMENTS

| | | | | |
|---|---|---|---|---|
| 5,558,595 | A | * | 9/1996 | Schmidt et al. |
| 5,603,671 | A | * | 2/1997 | Schmidt |
| 5,730,676 | A | * | 3/1998 | Schmidt ............... 475/5 |
| 5,907,191 | A | | 5/1999 | Sasaki et al. |
| 5,914,575 | A | | 6/1999 | Sasaki |
| 5,991,683 | A | | 11/1999 | Takaoka et al. |
| 6,478,705 | B1 | * | 11/2002 | Holmes et al. |
| 6,540,631 | B1 | * | 4/2003 | Holmes ................ 475/5 |
| 6,569,055 | B1 | * | 5/2003 | Urasawa et al. |
| 6,579,201 | B1 | * | 6/2003 | Bowen |
| 6,726,592 | B1 | * | 4/2004 | Kotani |
| 6,751,960 | B1 | * | 6/2004 | Arimitsu et al. |
| 6,793,600 | B1 | * | 9/2004 | Hiraiwa |
| 2002/0094898 | A1 | * | 7/2002 | Hata et al. |
| 2003/0073534 | A1 | * | 4/2003 | Oshidari et al. |
| 2004/0043856 | A1 | * | 3/2004 | Xiaolan |
| 2004/0084233 | A1 | * | 5/2004 | Wakuta et al. |
| 2004/0092353 | A1 | * | 5/2004 | Moeller |

FOREIGN PATENT DOCUMENTS

| | | |
|---|---|---|
| EP | 0867323 A2 | 9/1998 |
| EP | 0867323 A3 | 10/1999 |
| WO | 0242658 | 5/2002 |
| WO | 03035422 | 1/2003 |

OTHER PUBLICATIONS

U.S. Appl. No. 60/343,336, filed Oct. 22, 2001.*

* cited by examiner

*Primary Examiner*—Tisha Lewis
(74) *Attorney, Agent, or Firm*—Polster, Lieder, Woodruff & Lucchesi L.C.

(57) ABSTRACT

A method for power management in an electro-mechanical power-split infinitely variable transmission (eVT) designed to be operated within a designated speed ratio range for vehicular applications. The eVT is comprised of an input shaft coupled to the output shaft of a drive engine to receive power, a drive shaft, two electric machines, and a pair of planetary trains each having a sun member, a ring member, a set of planetary members, and a planet carrier. The eVT further contains one or more torque transfer devices to connect or disconnect members of the planetary trains for transferring torque. The drive shaft is coupled with a final drive of a vehicle for delivering or recapturing power to or from the vehicle drive wheels. The two electric machines are interconnected electronically via a power control unit and are coupled respectively with members of the planetary train. The method of power management in the eVT is selected based on the current speed and torque of the input and drive shafts, and upon the desired operating parameters.

31 Claims, 4 Drawing Sheets

METHOD AND APPARATUS FOR POWER FLOW MANAGEMENT IN ELECTRO-MECHANICAL TRANSMISSIONS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

This invention relates in general to transmissions for transmitting rotary motion and, more particularly, to a method for power flow management in an electro-mechanical output power-split and compound power-split infinitely variable transmission.

The primary function of a transmission in an automotive vehicle is to convert the output speed and torque of an engine or prime mover into the speed and torque of a drive shaft to meet the specific requirements of the vehicle. In general it is desirable for this power transmission to occur with minimal power loss; that is, at high transmission efficiency. To optimize the overall power train performance, specifically the engine and transmission combination, it is also desirable to minimize engine transients and operate the engine at a power state that yields the best tradeoff between good fuel economy, low emissions and power.

Transmissions can be broadly categorized as "step-less" or "stepwise", according to the way that the final desired speed ratio is achieved. A stepwise transmission has a fixed number of speed ratios that are sequentially selected to achieve the final desired ratio. Therefore, it is not always possible to use the maximum available engine power, because engine speed and load vary as the transmission moves through its limited number of fixed ratios. Moving from one ratio to another is sometimes termed "shifting" in transmission design descriptions, and is often associated with unfavorable torque interruptions. Such interruptions offset overall drive-line efficiency and detract from driving comfort. Moreover, for some applications, such as agricultural and construction vehicles, an output torque interruption is extremely undesirable, more so than a momentary loss of efficiency. Such inherent shortcomings, associated with shifting, are minimized to some extent in more recent designs that incorporate pre-shifting and clutching to reduce torque interruptions. To reduce engine speed and torque variations, modern transmissions use a greater number of selectable ratios.

In principle, a stepwise transmission cannot achieve the overall vehicle efficiency of a step-less transmission which offers an infinite number of speed ratios. With a step-less transmission, there is the option to operate the engine at its optimum efficiency or lowest emission point at all times while the vehicle is moving to its desired speed at a desired power level.

Step-less transmissions can be further classified into continuously variable transmissions (CVTs) and infinitely variable transmissions (IVTs). A continuously variable transmissions, usually mechanical, provides continuously variable speed ratios over the designed speed range of the vehicle. A launch-clutch and engine-disconnect device is often required in this type of transmission for vehicle start-up, as well as a separate gear for reverse operation. In addition, most of the CVT designs transmit torque through contacting friction surfaces and are not suitable for high-torque and high-power applications.

The infinitely variable transmission, by definition, is capable of providing infinitely selectable (output-to-input) speed ratios from reverse, thru zero, to a wide range of forward speeds. No launching device is required for an IVT. In theory, the engine can be directly connected to the transmission at all times, because a zero output-to-input speed ratio or an infinite input-to-output speed ratio exists. An IVT transmission is based on a power-split concept that provides multiple, often hybrid, power paths. Among the multiple power paths, there exists at least one power path that regulates the power flow and thus provides the input-to-output speed ratio controlling path. The actual devices that effect the speed ratio change within the regulating path is called a variator. A well designed power-split transmission is able to transmit power from the input to the output in at least two parallel power paths, one path being the regulating or variator path, and one path being a mechanical path. While the speed ratio is controlled in the variator path, it is most desirable to have the majority of the power pass through the mechanical path were the efficiency is the highest.

The speed ratio change is made by the variators by regulating the power that is transmitted through the variator path. There are moments where the power that passes through the variator path is literally zero. That is, all power is transmitted through the mechanical path. At these moments, the transmission yields the highest efficiency. The transmission output-to-input speed ratios or the output speeds at these points are often referred to as node points or nodes. The node point corresponding to the lowest output-to-input speed ratio or the lowest output speed is called the first node point. The node point corresponding to the next higher output-to-input speed ratio or the next higher output speed is the second node point, etc.

In an electromechanical infinitely variable transmission (eVT), the variators are electric machines, namely motors and generators. The advantages of using electric motors and generators include system design flexibility, controllability, and improved performance in terms of a wider range of speed, better efficiency, and reduced operating noise. The electromechanical transmission may also be used in conjunction with energy storage devices to supplement the output power, allowing the engine to be downsized and/or to operate at an optimum efficiency point for a greater period of time. These so-called hybrid electro-mechanical power-split transmissions have been recently designed for use in both cars and in heavy trucks.

There are three basic power-split configurations, the "input power-split", the "output power-split", and the "compound power-split". These three configurations define different relationships between the power within the variator path and the speed ratio of the transmission. Input power-split and output power-split configurations are often devices with single planetary transmissions, and are capable of providing at least a single node point. Compound power-split configurations are associated primarily with compound planetary transmission, and are capable of providing at least two node points.

Within power-split transmissions, there are moments when the speed ratio goes beyond a certain range and the power in the electric path can actually exceed several times the power that is transmitted through the mechanical path in the transmission. This phenomenon is known as internal power circulation. It consumes power and decreases transmission efficiency by generating unwanted heat within the transmission.

For input power-split transmissions, internal power circulation occurs when output-to-input speed ratio is somewhere below the node point. When the transmission is operated in the slow speed regime, power in the variator path can actually exceed several times the power that is transmitted through the transmission. Likewise, internal power circulation can occur with output power-split transmissions when operated at high output-to-input speed ratios (overdrive), somewhere above the node point, or in reverse operation. Compound power-split transmissions have very high efficiency when operated between the two node points. Internal power circulation occurs at speed ratios somewhere below the first node point or above the second node point.

To restrict power circulation through the electric machines and to control the magnitude of the electric power in the electric power path, various control systems are known, for example, as shown in European Patent No. 0 867 323 A2 and in U.S. Pat. Nos. 5,907,191, 5,914,575, and 5,991,683 for an output power-split configuration and an input-power-split configuration. These control systems employ a torque control routine to monitor the electric motor torque and to shift the engine's operating point to a higher engine speed when the torque limit of the electric motor is reached. However, in doing so, the engine is operated at a point which is less than optimal.

An alternate control system is shown in U.S. Pat. No. 6,478,705 B1 to Holmes, et al., the '705 patent. This '705 patent discloses an eVT having two differential gearsets coupled to an engine and first and second electric machines, wherein the gearsets are configurable in input-split and compound-split modes. The control system disclosed in the '705 patent provides for shifting between the input-split and compound-split modes of operation only at a zero speed point of one of the electric machines, thereby permitting smooth synchronous clutch engagement. However, since the mode shift in the control system of the '705 patent occurs independently of the state of the second electric machine, the problem of internal power circulation remains when the transmission is operated in reverse, and when the second electric machine continues to provide torque to the system during a mode shift.

Accordingly, it would be advantageous to develop an eVT which does not suffer from the above-mentioned internal power circulation problem when operated within the designed speed ration ranges specified by a vehicle application.

BRIEF SUMMARY OF THE INVENTION

Briefly stated, the present invention provides a method for power management in an electromechanical power-split infinitely variable transmission (eVT) designed to operate— within a designated speed ratio range for vehicular applications. The eVT is comprised of an input shaft coupled to the output shaft of a drive engine to receive power, a drive shaft, two electric machines, and a pair of planetary trains each having a sun member, a ring member, a set of planetary members, and a planet carrier. The eVT further contains one or more torque transfer devices to connect or disconnect members of the planetary trains for transferring torque. The drive shaft is coupled with a final drive of a vehicle for delivering or recapturing power to or from the vehicle drive wheels. The two electric machines are interconnected electronically via a power control unit and are coupled respectively with members of the planetary train. The method of power management in the eVT is selected based on the current speed and torque of the input and drive shafts, and upon the desired operating parameters.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
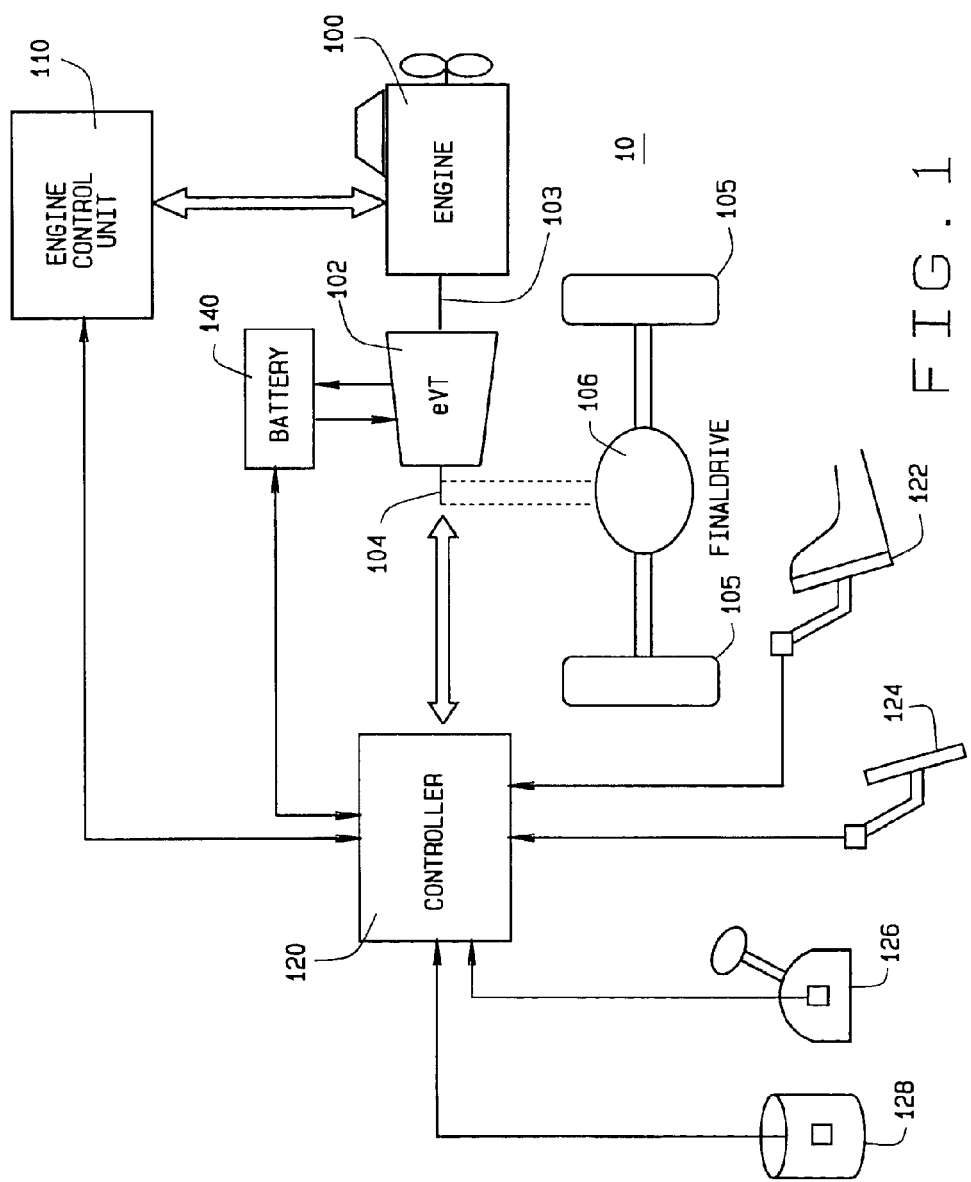
FIG. 1 is a schematic diagram of the components associated with a vehicle drive system.

Turning first to FIG. 1, a vehicle drive system for use with the current invention is shown generally at 10. The system 10 includes an engine 100, an electro-mechanical power-split infinitely-variable transmission 102 having an input shaft 103 from the engine and a drive shaft 104 coupled to drive wheels 105 via a final drive 106. The system 10 further includes an engine control unit 110 for controlling the operation of the engine 100 and a power-train control unit 120 for communicating with the engine control unit 110 and for controlling the operation of the transmission 102 and the engine 100 based upon information provided by an accelerator pedal 122, a brake pedal 124, a gear-shift selector 126, a drive mode selector 128, and other sensors of the vehicle. The system may further include a storage battery 140 for supplying power to, or receiving power from, the transmission 102 based upon the operating conditions and the state of the battery charge (SOC).

Figure 2:
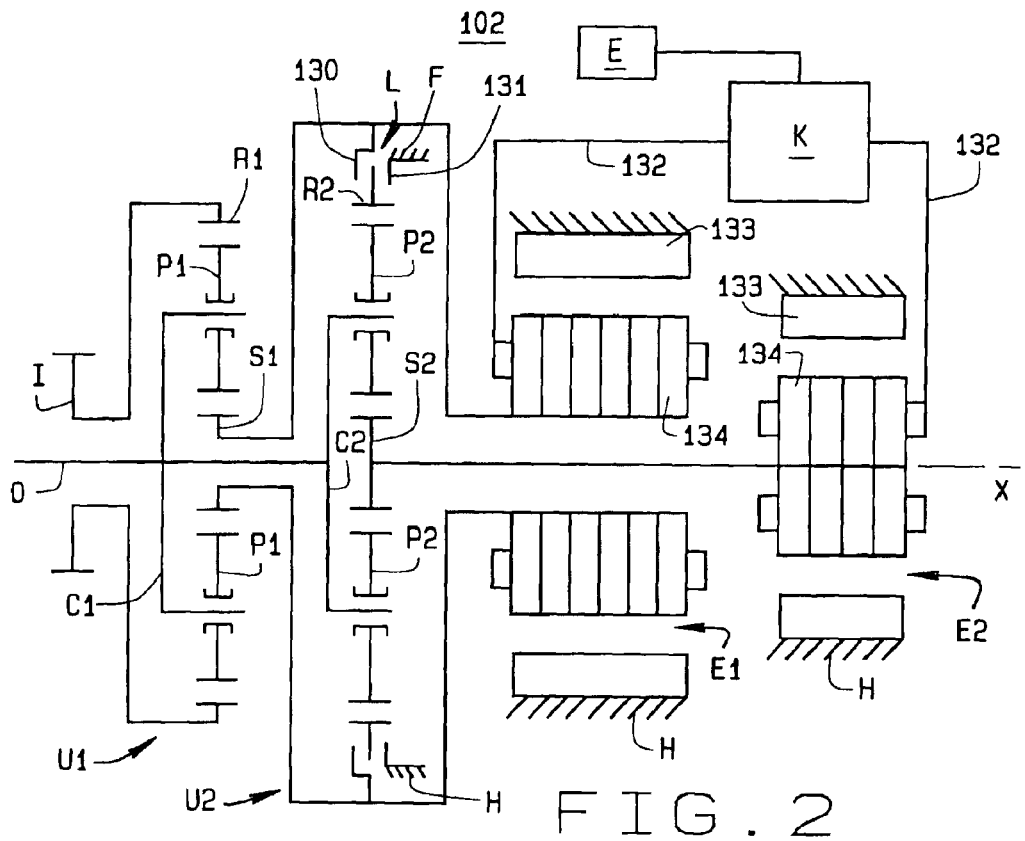
FIG. 2 is a schematic view of an electromechanical power-split infinitely-variable transmission constructed in accordance with and embodying the present invention.

Turning to FIG. 2, a first exemplary embodiment of the electro-mechanical power-split infinitely variable transmission 102 is shown. The transmission 102 is comprised of a mechanical portion and an variator portion, where the variators are electric machines E1 and E2, working either as motors or generators. The transmission 102 has infinite speed ratios and operates in at least two modes—namely, an output-split mode and a compound-split mode—depending on several factors including transmission speed ratio, output speed, and power demands. To this end, the transmission 102 in each of its modes transfers power through two paths—specifically, through a purely mechanical path and through a variator path. The mechanical path provides no basis for varying the speed ratio of the transmission 102. The variator path does that for both modes of operation. Thus, the transmission 102 operates on a power-split principle. The transmission may also operate in a series hybrid mode as will be discussed later.

When in the output-split mode, the transmission 102 has its greatest input-to-output ratio, that is to say its lowest output speeds. While the transfer of power occurs generally through both the mechanical path and the variator path, as the output speed increases, the transfer of power comes to a point or node during which all of the transfer occurs in the mechanical path. When in the compound power-split mode the transfer of power occurs through a somewhat different mechanical path and the variator path, except at two points or nodes when the transfer occurs purely through the mechanical path—one a low speed node and the other a high speed node. The low speed node for compound-split mode corresponds with the single node for the output-split mode. The transition between modes occurs at the low speed mode without interruption in torque and is otherwise imperceptible. Thus, the transmission 102 offers the advantages of both a compound-split transmission, which provides high efficiency between its node points, and an output-split transmission, which provides high efficiency at high input-to-output speed ratios and at vehicle launch.

While the electromechanical power-split, infinite variable transmission 102 can assume any one of several configurations, each configuration has the following components:

1. two planetary units U1 and U2
2. two electric machine variators E1 and E2
3. a torque transfer-device L
4. an input I
5. an output O
6. a control unit K
7. a housing H It may also have an energy storage device E.

Each planetary unit U1, U2 includes a sun member S, a ring member R located around the sun member, at least one and more likely more planets P located between the sun members and the ring member R, and a carrier member C coupled with the planets P and providing axes about which the planets P rotate. Thus, each planetary unit U1 and U2 has three concentric members, namely its sun member S, its ring member R, and its carrier member C. Typically, the sun member S, the ring member R and the planets P are gears which mesh, although there may be traction rollers which transfer power purely through friction contacts without any mechanical interlock as in gear systems. The two planetary units U1 and U2 are contained within the housing where they are organized about a common axis X. Eccentric arrangements are also possible. The unit U1 has a sun member S1, a ring member R1, planets P1, and a carrier member C1. Likewise, the unit U2 has sun member S2, a ring member R2, planets P2, and a carrier member C2.

Preferably, the first sun member S1 is operatively connected to the first electric machine E1, and the second sun member S2 is operatively connected to the second electric machine E2.

When the transmission 102 operates in its compound-split mode, the two planetary units U1 and U2 are compounded. In particular, one of the three concentric members of the unit U1 is connected to the one of the three concentric members of the unit U2, and another of the three members of the unit U1 is connected to another of the three members of the unit U2, thus forming two compound member branches and leaving two single member branches. Preferably, the two carrier members C1 and C2 are joined to form one compound member branch, operatively connected to the output O. The ring member R2 may be selectively joined to the sun member S1 through a clutch 130 to or from another compound member branch or to a fixed member F of the transmission 102 through a brake 131. This leaves the ring member R1 and the sun member S2 as the single member branches. One of the compound member branches is connected to one of the variators E1, E2 and the other to the output O.

In the example, the compound member branch formed by the sun member S1 and ring member R2 is connected to the variator E1, whereas the other compound member branch formed by the coupled carrier members C1 and C2 is connected to the output O. One of the single member branches is connected to the input I and the other to the other variator E2. In the example, the ring member R1 is connected to the input I and the sun member S2 is connected to the variator E2.

Turning now to the variators E1, E2, each has the capacity to deliver (generate) power and receive (consume) power. They are connected together by an electric conduit 132 through a control unit K so that when the variator E1 generates power, the variator E2 may consume the power so generated, and conversely, when the variator E2 generates power, the variator E1 may consume the power generated. Typically and preferably each variator E1, E2 is an electrical machine capable of serving both as a generator and a motor. When so constructed, each variator E1, E2 includes a stator 133 that is mounted on the housing H and a rotor 134 that revolves in the housing H. The two variators E1 and E2 are optionally connected to the energy storage unit E through the control unit K.

The transition device L includes a clutch 130 and a brake 131. The clutch 130 has the capacity to sever or interrupt one of the compound member branches, thus disconnecting the member of the unit U1 that is in that branch from the member of the unit U2 that is in the branch. The brake 131 retards rotation of one of the disconnected members by preferably clamping it to the housing H, or in other words, "grounding" that disconnected member. When the clutch 130 is disengaged and the brake 131 applied, the transmission 102 operates in its output power-split mode, and conversely when the transmission 102 operates in its compound power-split mode the clutch 130 is engaged and the brake 131 is released.

The input I may be a simple shaft, a gear, a pulley, a sprocket, or some other type of coupling. The same holds true for the output O. Optionally, there may be a damping device between the engine 100 and input I of the transmission.

The control unit K controls the power transferred between the variators E1 and E2. It may transfer all of the power or modulate it. It may also transfer power to the energy storage device E, when the device E is present. The energy storage device E may take the form of an accumulator, a capacitor, a battery pack or a mechanical device such as a flywheel. It can release power to the control device K for transfer to one of the variators E1, E2.

For slow speed operation, from zero vehicle speed to the first node speed, the transmission 102 operates in the output-split mode. The clutch 130 disengages the first sun member S1 and the electric machine E1 from the second ring member R2. Correspondingly, the brake 131 engages, fixing the second ring member R2 to the ground or fixed member F.

At zero vehicle speed, the electric machine E2 is stationary, and provides the sole source of torque reaction to allow acceleration of the vehicle. The electric machine E1 is in a free wheeling state. At zero speed, this torque reaction consumes no mechanical power and only very small electrical power, hence, neither electric machine provides or consumes any substantial electric power.

As the vehicle moves forward, the electric machine E2 increases a rotational speed, and the torque load on the electric machine E2 decreases. The torque required for vehicle acceleration is shared between the engine 100 and the electric machine E2, which operates as a motor to provide torque assistance to the output O. Concurrently, electric machine E1 serves as a generator, providing resistant torque to the sun member S1, thus balancing the engine torque applied to the ring member R1. The electric power generated by the electric machine E1 is regulated through the control unit K and sent to drive the electric machine E2.

As the vehicle speed further increases, the speed of the electric machine E2 continues to increase and the torque correspondingly continues to decrease. The speed and torque of the electric machine E2 are in the opposite rotational directions until the transmission encounters the first node point, where the torque of the electric machine E2 momentarily drops to zero. Concurrently, the speed of the electric machine E1 becomes zero. At this first node point, no power is passing through the variator path. Rather, all power is being transmitted through the mechanical power path.

The first node point marks the end of the output-split mode and the beginning of a compound power-split mode of operation for the transmission 102. At the first node point, the clutch 130 engages, connecting the second ring member R2 to the first sun member S1 and to the first electric machine E1. The brake 131 disengages, releasing the second ring member R2 from the fixed member F.

As the vehicle speed continues to increase, the speed of the electric machine E2 starts to decrease, and the torque starts to increase in an opposite direction. Electric machine E2 operates as a generator, converting mechanical energy into electrical energy. Concurrently, electric machine E1 reverses direction, and increases rotational speed, serving as a motor to reconvert electrical energy into mechanical energy. Eventually, the transmission 102 encounters the second node point, where the speed of the electric machine E2 drops momentarily to zero, and the torque of the electric machine E1 becomes zero.

Beyond the second node point, the direction of rotation for the electric machine E2 reverses, and the torque of the electric machine E1 begins to increase in the opposite direction. Electric machine E2 returns to motor operation, and electric machine E1 returns to operation as a generator.

Since the mode shifting from output-split to compound-split is continuous in speed and torque, it is a smooth power shift. The power flow management method of the present invention, set forth below, leverages the advantages of an output-split configuration in slow speed operation and of a compound-split configuration during medium to high-speed operation, eliminating internal power circulation over the entire speed range. Consequently, the transmission 102 is able to provide a high degree of operating efficiency over a wide speed range.

Figure 3:
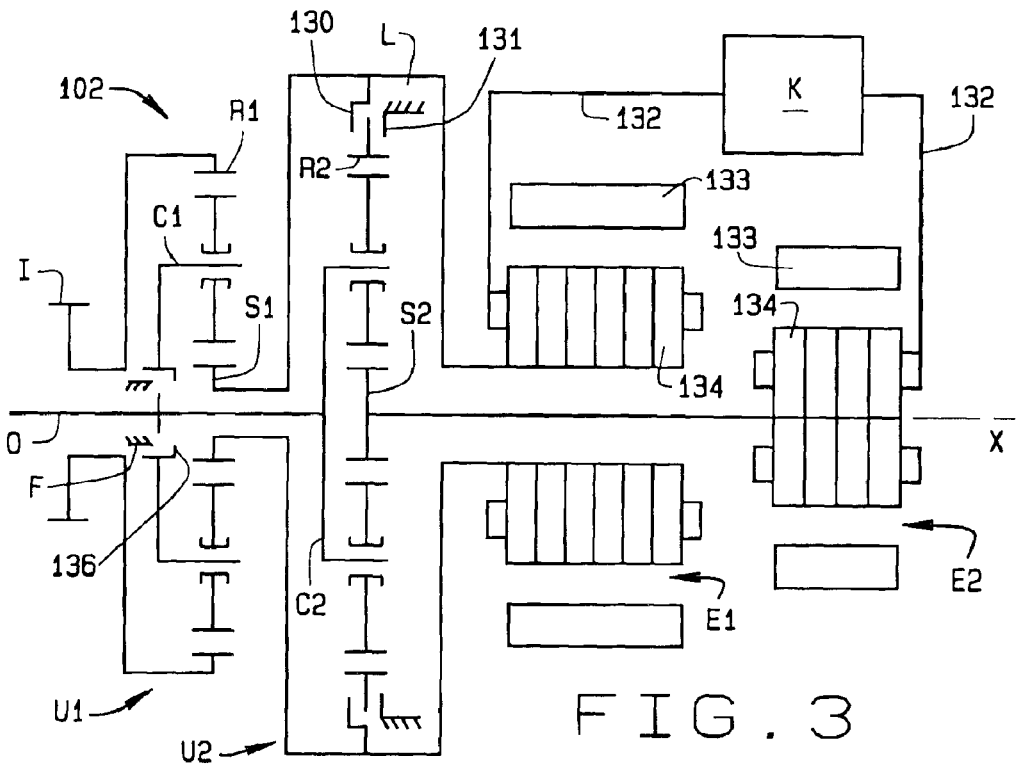
FIG. 3 is a schematic view of a modified electromechanical power-split infinitely-variable transmission similar to the transmission of FIG. 2, but further including components for park and reverse.

Those of ordinary skill in the art will recognize that the functionality of the transmission 102 may be enhanced by the addition of other clutches, brakes, and gears, such as shown in FIG. 3, illustrating the addition of a clutch 136 and brake 138. The addition of the clutch 136 and brake 138 provide parking and series hybrid mode reverse functionality. Parking functionality is realized by engaging the clutch 136 and the brake 138.

For series electric hybrid reverse operation, the brake 138 is engaged, grounding the first carrier C1 to the fixed member F. The clutch 136 is disengaged, disconnecting the carrier C1 from the output shaft O. The brake 131 engages, grounding the second ring member R2 to the fixed member F. Clutch 130 is disengaged, freeing the second ring member R2 from the first sun member S1, and from the electric machine E1.

During the series electric hybrid reverse operation, the first planetary train U1 serves as a speed increaser between the input I and the electric machine E1. The second planetary train U2 serves as a speed reducer between the electric machine E2 and output O. The mechanical input I from the engine drives the electric machine E1 through the first planetary train U1 to generate electric power. The first planetary train U1 amplifies the input speed, which in many cases is desirable for an electric machine to generate electric power. The electric power is then used by the electric machine E2 to power the vehicle through the second planetary train U2 where torque is amplified.

The method of the present invention for power flow management in the transmission 102 will be described with reference to a single sequence of repeating steps shown in the flow chart of FIG. 4. This single sequence is executed repeatedly during vehicle operation at a predetermined time interval to maintain the transmission 102 and engine in a desired operating state. Initially, as shown in step S100, sensor outputs are obtained. Included in these, the speed of the drive shaft O, identified as $\omega_d$ is determined. The speed information for the drive shaft O can be provided by one or more speed sensors mounted to detect the drive shaft speed directly, or may be determined indirectly through the speed of the driven wheels 105. Other sensor information would typically include engine speed, accelerator pedal position, brake pedal position, battery state of charge, gear shift selector and drive mode selector.

Figure 4:
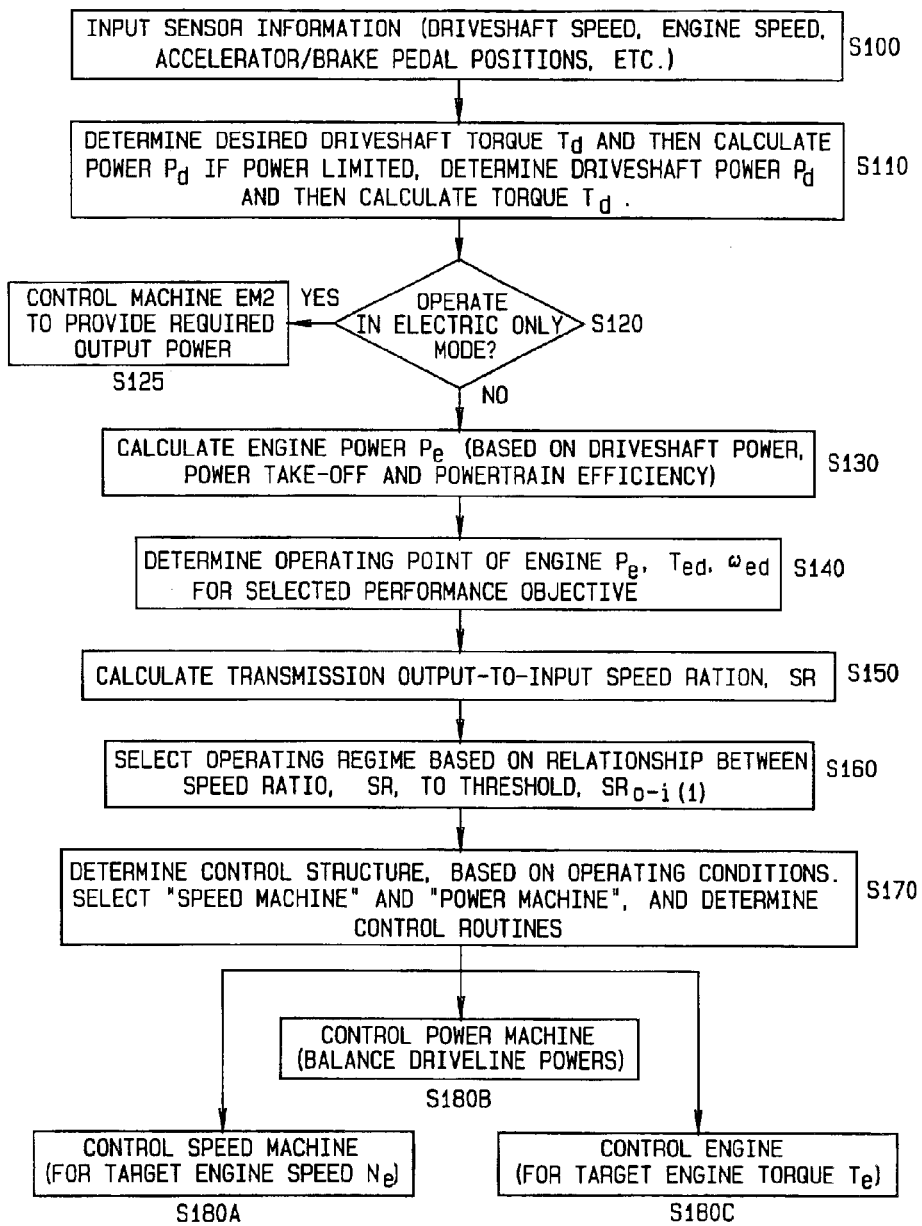
FIG. 4 is a flow chart which describes the high level power flow and electric machine control decisions employed in the control of the transmission.

Next, a determination of the desired drive shaft torque $T_d$ and power $P_d$ is made, as shown in Step S110 of FIG. 4. The torque required to propel the vehicle to achieve a driver's desired performance is set by the position of the acceleration pedal, PA, and the position of the brake pedal, PB:

$$T_d = C_{K1} \cdot PA - C_{K2} - C_{K3} \cdot PB \qquad \text{Equation (1)}$$

where $C_{K1}$, $C_{K2}$ and $C_{K3}$ are constants. For non-hybrid operation, $C_{K2}$ and $C_{K3}$ would normally be zero. For hybrid operation, $C_{K2}$ and $C_{K3}$ may both be nonzero, allowing a negative output torque command. A negative output torque command will slow the vehicle and allow the vehicle's kinetic energy to be recaptured for recharging of the battery or other energy storage device. Operation in this mode is commonly referred to as regenerative braking. The desired output power to the drive shaft is then calculated as:

$$P_d = \omega_d \cdot T_d \qquad \text{Equation (2)}$$

When the vehicle is operated at high speeds, the maximum output torque to the drive shaft O may be limited by the maximum available power. In this case, the desired output power to the drive shaft is determined by the position of the acceleration pedal PA and brake pedal PB:

$$P_d = C_{K4} \cdot PA - C_{K5} - C_{K6} \cdot PB \qquad \text{Equation (3)}$$

where $C_{K4}$, $C_{K5}$ and $C_{K6}$ are constants. $C_{K5}$ and $C_{K6}$ are normally zero in non-hybrid operation. The desired output torque to the drive shaft is then calculated as:

$$T_d = \frac{P_d}{\omega_d} \qquad \text{Equation (4)}$$

A map representing the relationships established by Equation (1) through Equation (4) for each and every drive shaft speed and pedal position can be stored prior to use in a ROM or other suitable storage component associated with the control unit K. Alternately, the equations may be calculated on-line in control unit K directly from Equations (1) through Equation (4).

With hybrid operation in the low speed mode, it may be desirable to drive the vehicle over short distances with the engine shut off if the required transmission output power $P_d$ is small. This would prevent operation of the engine at low power operating points, where the thermal efficiency of the engine is typically poor. Herein, this condition is referred to as "electric-only operation". In electric-only operation, the electric machine E2 provides power to propel the vehicle through the speed reduction obtained through planetary train U2. No torque is applied to electric machine E1. The battery or other energy storage device is used to provide the power to electric machine E2.

Step S120 in FIG. 4 illustrates the decision to operate in electric-only mode. Electric-only operation would normally be prohibited at high vehicle speeds, when the commanded output power $P_d$ is high, when commanded output torque $T_d$ is high or if the energy stored in the battery or other energy storage device was low. In this electric-only mode, the electric machine E2 can be used to propel the vehicle, indicated in step S125 in FIG. 4. When a requirement arises to restart the engine due to high speed, for example, the engine can be restarted using electric machine E1.

The next step, represented as S130 in FIG. 4, is to determine the desired engine output power $P_e$. The desired engine output power $P_e$ is determined by the required drive shaft power $P_d$ plus any mechanical power $P_{pto\_m}$ and electrical power $P_{pto\_e}$ taken off from the engine and transmission. In desired engine output power calculations, the powertrain efficiency η is taken into consideration, as shown for example, in the following equation:

$$P_e = \frac{(P_d + P_{pto\_m} + P_{pto\_e})}{\eta} \qquad \text{Equation (5)}$$

The mechanical power take off $P_{pto\_m}$ includes all mechanical power required to drive various auxiliary machine devices such as a compressor of an air-conditioner and a water-cooling pump. The electric power take off $P_{pto\_e}$ includes the electrical power used to charge the vehicle batteries, and electrical power consumed by various electronic devices on the vehicle, such as a radio, lights, etc. In cases where the transmission 102 is dedicated to regulating the speed ratio only, no electrical power is taken off the transmission 102, and $P_{pto\_e}$ is zero.

In hybrid operation, during regenerative braking, the electric power $P_{pto\_e}$ would normally be equal in magnitude and opposite in sign to $P_d$. In this way, the engine power required, as calculated from Equation (5), would balance the mechanical power for the auxiliary machines and the braking energy contributed from the transmission output would be used to recharge the battery or other energy storage device.

The next step, S140, shown in FIG. 4 requires a determination of the desired engine operating point for a selected performance objective. The method of the present invention permits output power from the engine to be transmitted to the drive shaft to achieve various desired performance objectives, such as maximization of fuel economy.

Figure 5:
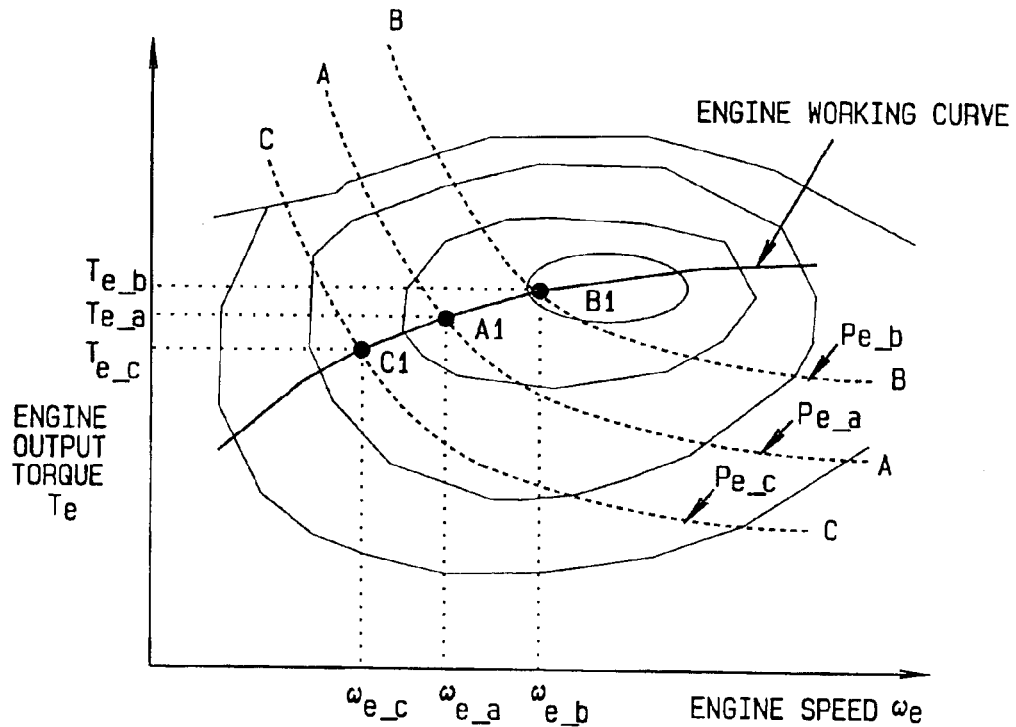
FIG. 5 is a schematic of the constant power and brake specific fuel consumption lines for a typical engine used to illustrate the determination of the engine target curve.

A maximization of engine fuel economy can be achieved with the use of a brake specific fuel consumption (BSFC) map of the engine. A BSFC map, such as shown in FIG. 5, may be obtained experimentally. As seen in FIG. 5, the ordinate indicates engine speed, and the abscissa indicates the engine output torque. For a given constant engine power line, such as A—A, which corresponds to engine output power $P_{e\_a}$, there exists a point A1 which provides the lowest BSFC or best fuel economy. The speed $\omega_{e\_a}$ and torque $T_{e\_a}$ of the engine at the point A1 establish an optimal fuel economy power state $P_{e\_a}(\omega_{e\_a}, T_{e\_a})$. On an adjacent constant power line B—B, a similar fuel economy power state $P_{e\_b}(\omega_{e\_b}, T_{e\_b})$ can be identified at point B1. By repeating the process for each and every constant power line, a series of fuel economy power states $P_{e\_i}(\omega_{e\_i})$ for i=(a, b, c, . . . ) can be established. A connecting line between each of the fuel economy power states, from low power to high power defines a working curve for the engine at which the best fuel economy is achieved for the required engine output power. Since the extreme point on this working curve is at the engine's maximum power operating point, this approach simultaneously provides the greatest vehicle acceleration when the accelerator pedal is at its maximum. For various desired engine output power levels $P_e$, this working curve can be stored as torque $T_e$ and speed $\omega_e$ lookup table(s) in a ROM or other data storage component associated with the controller K.

In a variation of the method of the present invention, an alternative objective is to achieve engine operation at the lowest emissions point for various engine output power levels. Emission maps can be obtained experimentally to yield data similar to the BSFC maps shown in FIG. 5, from which a similar engine working curve for the lowest emissions can be established and stored as torque $T_e$ and speed $\omega_e$ lookup table(s) or other regression equations in a ROM or other data storage component associated with the controller K.

Those of ordinary skill in the art will recognize that other calibrations are possible in which a performance objective is established that provides a compromise between the lowest engine BSFC and lowest emissions, since these are normally obtained at different engine operating points. Other constraints may also be considered in determining the performance objective, such as noise or vibration levels in the vehicle.

Once the desired engine operating point for a selected performance objective has been identified in step S140 of FIG. 4, the output-to-input speed ratio is calculated, as shown in step S150. The speed ratio of the transmission is one of the parameters used to determine the transmission operating regime and control structures for the electric machines E1 and E2.

At the first node point, the transmission shifts between the output power-split and compound-split configurations. The output-to-input speed ratio at the node point is given by:

$$SR_{o-i(1)} = \frac{K_1}{K_1+1} < 1 \qquad \text{Equation (6)}$$

where $K_1$ is the planetary ratio of the first planetary train U1, defined as the pitch diameter ratio of the first ring member R1 to the sun member S1. Similarly, the output-to-input speed ratio at the second node point is given by:

$$SR_{o-i(2)} = \frac{K_1 K_2}{K_1 K_2 - 1} > 1 \qquad \text{Equation (7)}$$

where $K_2$ is the planetary ratio of the second planetary train U2, defined as the pitch diameter ratio of the second ring member R2 to the sun member S2.

Below the speed ratio defined by Equation (6), the transmission 102 is operated in the low speed regime where the transmission 102 is in the output power-split configuration by engaging the brake 131 and disengaging the clutch 130. Above the speed ratio, the transmission 102 is operated in the high-speed regime where the transmission 102 assumes a compound power-split configuration by engaging the clutch 130 and disengaging the brake 131. This decision is shown in step S160. The shifting from the output power-split mode to the compound-split configuration may be further subjected to other constraints, such as a minimum engine speed constraint and a minimum vehicle speed constraint.

When the transmission is operated in compound-split mode between the two node points, the maximum power required at the electric machine can be approximated by:

$$P_{elc\_max} \approx \alpha \cdot P_{in} + \beta \cdot P_{pto\_e} \qquad \text{Equation (8)}$$

where $P_{in}$ is power delivered to the input of the transmission, $$\alpha = \frac{\sqrt{\phi}-1}{\sqrt{\phi}+1}, \quad \phi = \frac{SR_{o-i(2)}}{SR_{o-i(1)}} \qquad \text{Equations (9, 10)}$$

and $0 \leq \beta \leq 1$ for all conditions, hence:

$$\frac{\sqrt{\phi}-1}{\sqrt{\phi}+1} < P_{elc\_max} < \frac{\sqrt{\phi}-1}{\sqrt{\phi}+1} \cdot P_{in} + P_{pto\_e} \qquad \text{Equation (11)}$$

Figure 6:
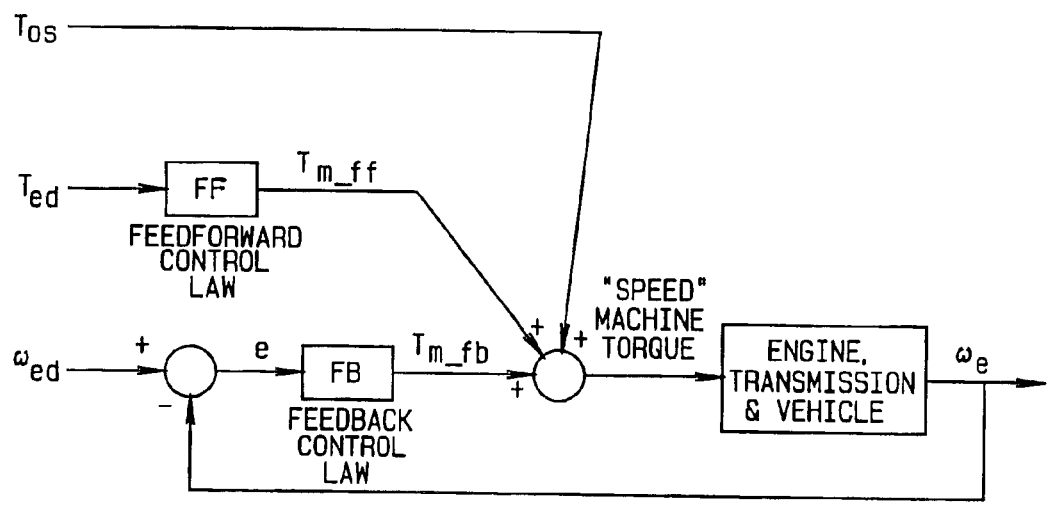
FIG. 6 is a block diagram of the control loop used to control the engine speed though operation of an electric machine in the transmission.

Once the desired operating point of the engine and the operating regime of the transmission have been selected, one of the electric machines, E1 or E2, together with the engine throttle, can be operated to drive the engine to the desired operating point and provide the requested output shaft power. In the current invention, this is accomplished using feedforward and feedback control loops. An example of the engine speed control loop is shown in FIG. 6. The desired engine operating speed, $\omega_{ed}$, was calculated in step S140 of FIG. 4, described previously. This desired engine operating speed is compared to the measured engine speed, $\omega_{ed}$ and the speed error, e, is computed. A feedback control law, FB, operates on this error to produce the feedback control motor torque, $T_{m\_fb}$, that would be applied to the electric machine that is selected as the speed control motor. As examples, the control law could be a proportional or proportional-integral control law that would be familiar to those of ordinary skill in the art.

In order to provide faster transient response or better stability margins in the feedback control, a feedforward control law FF may be used to compute a feedforward torque, $T_{m\_ff}$, that can be added to the electric machine torque. This feedforward torque is based on the desired engine operating torque, $T_{ed}$. The feedforward torque would ordinarily represent the electric machine torque required to balance the desired engine operating torque under steady state conditions.

In most operating modes and transmission output-to-input speed ratio ranges, electric machine E1 is used for controlling engine speed in the current invention. As used herein, the term "speed machine" refers to the electric machine used for speed control. Under non-hybrid mode operation at high output speeds, it may be desirable to use electric machine E2 as the speed machine for reasons of improved stability margin. Thus, the control structure is switched to use E2 as the speed machine in non-hybrid mode at high output speeds. In the current embodiment, this control structure is switched at the direct drive ratio, i.e., at the point where $SR_{o-i}=1$. However, other values of output-to-input speed ratio, $SR_s$, may be selected for this switch provided that the speed ratio satisfies Equation (12).

$$SR_{o-i(1)} < SR_s < SR_{o-i(2)} \qquad \text{Equation (12)}$$

A constant offset torque, $T_{os}$, shown in FIG. 6, is added to the speed machine torque to provide a smooth transition when the control structure is changed.

The electric machine that is not used as the speed machine is adjusted to balance power requirements on the transmission. As used herein, the term "power machine" refers to the electric machine used for balancing power demands on the planetary transmission.

Returning to FIG. 4, at step S170, the control structure is determined based on the operating mode and output-to-input speed ratio. The speed machine and power machine are also selected.

As previously described in connection with Steps S160 and S170, there are regime changes at $SR_{o-i}=SR_{o-i(1)}$ and a control structure change at $SR_{o-i}=1$. These two change points in the speed ratio, along with other conditions, divide the entire speed ratio range into three segments as shown below in Table (1). Accordingly, three control regimes can be defined as will be discussed in detail below.

TABLE (1)

| Segment | Condition | Power Split | Speed Machine | Power Machine |
|---|---|---|---|---|
| SG-I | $SR_{o-i} \leq SR_{o-i(1)}$ | output | E1 | E2 |
| SG-II | $SR_{o-i(1)} < SR_{o-i} < 1$ or hybrid mode | compound | E1 | E2 |
| SG-III | $SR_{o-i} > 1$ and non-hybrid mode | compound | E2 | E1 |

Different segments preferably have different calculation routines for each electric machine E1, E2 in which the machine command is set.

In segment SG-I, the first electric machine E1 is used as the "speed machine" and the second electric machine E2 is used as the "power machine". The transmission 102 is in an output power-split configuration. The torque command value $T_{E1}$ for the first electric machine E1 is calculated as follows:

$$T_{E1} = \frac{T_{R1}}{K_1} + \varphi_{SGI}(\omega_e^* - \omega_e) \qquad \text{Equation (13)}$$

where $T_{R1}$ is the input torque to the first ring member R1 of the transmission 102, and $\phi_{SGI}(\ )$ is a feedback function of speed error $\omega_e^* - \omega_e$.

The input torque $T_{R1}$ is related to the engine torque command $T_e$ through the following equation:

$$T_{R1} = T_e - \frac{P_{pto\_m}}{\eta \omega_e} \qquad \text{Equation (14)}$$

The feedback function of speed error $\phi_{SGI}(\ )$ may, for example, take the following forms shown below in Equation (15a) or (15b):

$$\phi SGI(\omega_e^* - \omega_e) = C_{f1}(\omega_e^* - \omega_e) + C_{offset} \qquad \text{Equation (15a)}$$

or $$\phi_{SGI}(\omega_e^* - \omega_e) = C_{f1}(\omega_e^* - \omega_e) + C_{offset} \qquad \text{Equation (15b)}$$

where $C_{f1}$, $C_{f2}$, and $C_f$ are constants and $C_{offset}$ is an offset constant to allow smooth transitions between structures.

In segment SG-I, the power command value $P_{E2}$ for the second electric machine E2 is calculated to balance the electrical system power:

$$P_{E2} = -P_{E1} + P_{pto\_e} \qquad \text{Equation (16a)}$$

Alternatively, the torque command value $T_{E2}$ for the second electric machine E2 may be set to balance the system power:

$$T_{E2} = \left[\frac{K_1}{K_2 + 1} \cdot \frac{1}{SR_{o-i}} - \frac{K_1 + 1}{K_2 + 1}\right] \cdot T_{E1} - \frac{P_{pto\_e}}{(K_2 + 1)\omega_d} \qquad \text{Equation (16b)}$$

In segment SG-II, the first electric machine E1 remains as the "speed machine", providing torque to control the drive line speed, while the second electric machine E2 remains as the "power machine", providing the power balance requirements on the planetary trains U1 and U2. The key difference between segment SG-I and segment SG-II is that in segment SG-II, the transmission 102 is operating in the compound power-split configuration.

For segment SG-II, the new torque command value $T_{E1}$ for the first electric machine E1 is defined by Equation (17) as follows:

$$T_{E1} = \left(\frac{K_1 K_2}{K_2 + 1} \cdot \frac{1}{SR_{o-i}} + \frac{1 - K_1 K_2}{K_2 + 1}\right)\frac{T_{R1}}{K_1} - \qquad \text{Equation (17)}$$
$$\frac{K_2}{K_2 + 1} \cdot \frac{P_{pto\_e}}{\omega_d} + \varphi_{SGii}(\omega_e^* - \omega_e)$$

where $\phi_{SGII}(\ )$ is a feedback function of speed error which may take the same forms as $\phi_{SGI}(\ )$, shown in Equations (15a) and (15b) above.

The power command value $P_{E2}$ for the second electric machine E2 in segment SG-II is defined by Equation (16a).

Similarly, one can set the torque command value $T_{E2}$ for the second electric machine:

$$T_{E2} = \frac{T_{E1}}{K_2} - \frac{T_{R1}}{K_1 K_2} \qquad \text{Equation (18)}$$

In the third operating segment, SG-III, the transmission 102 continuously operates in the compound power-split configuration, but the control structure is preferably altered. The first electric machine E1 is now utilized as the "power machine" and the second electric machine E2 becomes the "speed machine". The torque command values for the speed machine $T_{E2}$ are computed from Equation (19) as follows $$T_{E2} = \left(\frac{K_1}{K_2 + 1} \cdot \frac{1}{SR_{o-i}} - \frac{K_1 + 1}{K_2 + 1}\right)\frac{T_{R1}}{K_1} - \qquad \text{Equation (19)}$$
$$\frac{1}{K_2 + 1} \cdot \frac{P_{pto\_e}}{\omega_d} + \varphi_{SGili}(\omega_e^* - \omega_e)$$

where $\phi_{SGIII}(\ )$ is a feedback function of speed error which may take the same forms as $\phi_{SGI}(\ )$, shown above in Equation (15).

The corresponding command values for the power machine (E1) are computed from:

$$P_{E1} = -P_{E2} + P_{pto\_e} \qquad \text{Equation (20a)}$$

Alternatively, the torque command $T_{E1}$ for the first electric machine E1 can be calculated as:

$$T_{E1} = \frac{T_{R2}}{K_1} + K_2 \cdot T_{E2} \qquad \text{Equation (20b)}$$

Those of ordinary skill in the art will readily recognize that in addition to the equations set forth above for determining command values for electric machines E1 and E2 in each operating segment of the transmission 102 that the torque and power command values may be limited to maximum values based upon the size of the electric machines E1 and E2.

Once the operating regime, i.e., SG-I, SG-II, or SG-III and associated control structure has been selected for the transmission 102, as shown in Steps S160 and S170 of FIG. 4, control of the speed machine, power machine, and engine is carried out in parallel as shown by Steps S180A, S180B, and S180C of FIG. 4.

Control of the speed machine, as shown in step S180A, depends largely upon the type of electric machine utilized in the transmission 102. For synchronous, permanent magnet electric machines, voltages applied to the winding coils may be controlled in accordance with the set torque command value to achieve the target value of torque through a fixed procedure. The voltage control is accomplished through conventional electronic circuits. Alternatively, currents flowing through the winding coils may be controlled in a conventional manner in accordance with the set torque command values to achieve the target torque value.

Control of the power machine, as shown in step S180B, also depends largely upon the type of electric machine utilized in the transmission 102. The power command is normally converted to an electrical command to the electric machine such as a current command that depends on the voltage applied. The voltage and currents may be controlled in a conventional manner as for the speed machine.

Finally, control of the engine, as shown in Step 180C is dependent upon the control of the speed machine. The engine control thus implies engine torque control through control of the engine fueling, injection or spark timing and/or throttle position, for example. The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

Those of ordinary skill in the art will recognize that the electric machines E1 and E2, i.e. the variators, must have a minimum power rating for operation as described above. The following equations describe the power relationship between the transmission mechanical input power $P_{in}$ (at the input shaft), transmission electric input power (at electric power take off) $P_{pto-e}$ and maximum variator power $P_{vmax}$. These relationship can used to establish a minimum power rating for each of the variators or electric machines E1, E2.

Assume $SR_1$ to be the transmission output-to-input speed ratio at which the first variator is at a zero rotation speed, and $SR_2$ to be the transmission output-to-input speed ratio at which the second variator is at zero rotation speed. The maximum power of one of the variator is achieved at the speed ratio defined by $$SR_{max} \sqrt{SR_1 \cdot SR_2(1=\omega)} \qquad \text{Equation (21a)}$$

where $$\psi = \frac{P_{pto-e}}{P_{in}} \qquad \text{Equation (21b)}$$

is the ratio of electric input power in the variator power path to the mechanical input power at the input shaft. Assuming $SR_2 \geq SR_1$, the maximum power ratio of the variator power to the transmission mechanical input power is given by:

$$\left(\frac{P_v}{P_{in}}\right)_{max} = \frac{\left(\sqrt{\frac{SR_2}{SR_1}(1+\psi)} - 1\right)^2}{\frac{SR_2}{SR_1} - 1} \qquad \text{Equation (22)}$$

Thus for a design specified input power $P_{in}$ at the transmission input shaft and for a designed hybrid power ratio $\psi$, the minimum power rating for the variators is established as:

$$P_v \geq \frac{\left(\sqrt{\frac{SR_2}{SR_1}(1+\psi)} - 1\right)^2}{\frac{SR_2}{SR_1} - 1} P_{in} \qquad \text{Equation (23)}$$

In general, $\psi$ is considered as the hybrid power ratio. That is, the ratio of power taken off from the variator path compared to the mechanical power input to the transmission at the input shaft. The hybrid power is usually in form of electric power, but can be hydraulic power or other form of power.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A power transmission system for regulating the delivery of power to a drive shaft, said power transmission system comprising:

an engine having an output shaft;

a pair of planetary trains operatively coupled between said output shaft and said drive shaft for transmitting power output from said engine to said drive shaft, each of said planetary trains including a sun member, a ring member, a set of planet members, and a planet carrier;

a first electric machine linked with at least said one member of a first planetary train in said pair of planetary trains for receiving and transmitting power to and from said drive shaft;

a second electric machine linked with said one member of a second planetary train in said pair of planetary trains for receiving and transmitting power to and from said drive shaft;

a set of torque transfer components operatively coupled to said pair of planetary trains, said set of torque transfer components including a clutch for selectively coupling a member of said first planetary train to a member of said second planetary train, and a brake for selectively coupling a member of said second planetary train to a fixed member of the power transmission system;

an engine control unit configured to provide an engine torque responsive to a target torque level established based on a performance objective;

a power control unit operatively coupled to said first and second electric machines, said power control unit configured to control a flow of electric power to and from each of said electric machines to regulate a magnitude of delivered power to the drive shaft, and said power control unit further configured to control said at least one set of torque transfer components; and wherein said first and second electric machines each have a power rating $P_v$ of:

$$P_v \geq \frac{\left(\sqrt{\frac{SR_2}{SR_1}(1+\psi)} - 1\right)^2}{\frac{SR_2}{SR_1} - 1} P_{in}$$

where $P_{in}$ is power delivered to the input of said power transmission system;

where $SR_1$ is the output-to-input speed ratio at which said first electric machine has a zero rotational speed;

where $SR_2$ is the output-to-input speed ratio at which said second electric machine has a zero rotational speed; and where ψ is a ratio of electric input power to said first and second electric machines to mechanical input power at said engine output shaft.

2. The power transmission system of claim 1 wherein said power control unit is configured to select a control structure for said first and second electric machines responsive to a speed ratio between said drive shaft and said engine output shaft.

3. The power transmission system of claim 2 wherein said power control unit is configured to control one of said first and second electric machines to provide torque to regulate said speed ratio.

4. The power transmission system of claim 2 wherein said power control unit is configured to control one of said first and second electric machines to provide torque to balance power in said pair of planetary trains.

5. The power transmission system of claim 1 wherein said power control unit is configured to selectively control said at least one set of torque transfer components responsive to a speed ratio between said drive shaft and said engine output shaft.

6. The power transmission system of claim 5 wherein said power control unit is configured to control said at least one set of torque transfer components to selectively couple two or more components of said pair of planetary trains in an output power-split configuration.

7. The power transmission system of claim 5 wherein said power control unit is configured to control said at least one set of torque transfer components to selectively couple two or more components of said pair of planetary trains in an compound power-split configuration.

8. The power transmission system of claim 5 wherein said power control unit is configured to control said at least one set of torque transfer components to alter one or more couplings between said pair of planetary trains between an output power-split configuration and a compound power-split configuration at a node point where a rotational speed of at least one of said first and second electric machines is substantially zero.

9. The power transmission system of claim 1 further including an energy storage device operatively coupled to said first and second electric machines; and
wherein said power control unit is operatively coupled to said energy storage device to regulate a flow of electric energy between said energy storage device, said first electric machine, and said second electric machine.

10. The power transmission system of claim 9 wherein said engine control unit is configured to shut off said engine responsive to a predetermined set of operating conditions; and
wherein said power control unit is further configured to control said torque transfer components to decouple said first and second planetary trains responsive to said predetermined set of operating conditions; and to regulate a flow of electric power from said energy storage device to at least one of said first and second electric machines, wherein said electric machine provides power to said drive shaft through said second planetary train.

11. The power transmission system of claim 2 wherein said power control unit is configured responsive to said speed ratio:
(a) at or below a first node point to regulate torque from said first electric machine and said second electric machine utilizing a first control regime; and
(b) greater than said first node point to regulate torque from said first electric machine and said second electric machine utilizing a second control regime.

12. The power transmission system of claim 11 wherein said power control unit is further configured responsive to said speed ratio greater than a switch point to regulate torque from said second electric machine and said first electric machine utilizing a third control regime.

13. The power transmission system of claim 12 wherein said power control unit is further configured to optionally utilize said third control regime in place of said second control regime when said speed ratio is greater than said first node point to regulate torque from said first electric machine and said second electric machine.

14. The power transmission system of claim 11 wherein said power control unit is configured responsive to said speed ratio at or below said first node point to regulate torque from said first electric machine to:

$$T_{EI} = \frac{T_{RI}}{K_1} + \varphi_{SGI}(\omega_e^* - \omega_e)$$

and the power from said second electric machine to:

$$P_{E2} = -P_{E1} + P_{pto\_e}$$

where $T_{R1}$ is the input torque to the ring member of the first planetary train;

$K_1$ is the planetary ratio of the first planetary train;

$\phi SGI(\omega_e^* - \omega_e)$ is a feedback function of engine speed error;

$P_{E1}$ is the electrical power from the first electric machine; and $P_{pto\_e}$ is the electrical power taken off from said engine and said pair of planetary trains.

15. The power transmission system of claim 11, wherein said power control unit is configured responsive to said speed ratio greater than said first node point to regulate torque from said first electric machine to:

$$T_{EI} = \left(\frac{K_1 K_2}{K_2+1} \cdot \frac{1}{SR_{o-i}} + \frac{1-K_1 K_2}{K_2+1}\right)\frac{T_{RI}}{K_1} - \frac{K_2}{K_2+1} \cdot \frac{P_{pto\_e}}{\omega_d} + \varphi_{SGII}(\omega_e^* - \omega_e)$$

and the power from said second electric machine to:

$$P_{E2} = -P_{E1} + P_{pto\_e}$$

where $T_{R1}$ is the input torque to the ring member of the first planetary train;

$K_1$ is the planetary ratio of the first planetary train;

$K_2$ is the planetary ratio of the second planetary train;

$SR_{o-i}$ is the speed ratio;

$\phi_{SGII}(\omega_e^* - \omega_e)$ is a feedback function of engine speed error;

$P_{E1}$ is the electrical power from the first electric machine; and $P_{pto\_e}$ is the electrical power taken off from said engine and said pair of planetary trains.

16. The power transmission system of claim 11 wherein said power control unit is configured responsive to said speed ratio greater than said first node point to regulate torque from said second electric machine to:

$$T_{E2} = \left(\frac{K_1}{K_2+1} \cdot \frac{1}{SR_{o-i}} + \frac{K_1+1}{K_2+1}\right)\frac{T_{R1}}{K_1} - \frac{1}{K_2+1} \cdot \frac{P_{pto\_e}}{\omega_d} + \varphi_{SGIII}(\omega_e^* - \omega_e)$$

and the power from said first electric machine to:

$$P_{E1} = -P_{E2} + P_{pto\_e}$$

where $T_{R1}$ is the input torque to the ring member of the first planetary train;

$K_1$ is the planetary ratio of the first planetary train;

$K_2$ is the planetary ratio of the second planetary train;

$SR_{o-i}$ is the speed ratio;

$\omega_d$ is the drive shaft speed;

$\phi_{SGIII}(\omega_e^* - \omega_e)$ is a feedback function of engine speed error;

$P_{E2}$ is the electrical power from the second electric machine; and $P_{pto\_e}$ is the electrical power taken off from said engine and said pair of planetary trains.

17. The power transmission system of claim 11 wherein said power control unit is configured responsive to said speed ratio:

(a) greater than said first node point and below a switch point less than a second said node point to regulate torque from said first electric machine to $$T_{E1} = \left(\frac{K_1 K_2}{K_2+1} \cdot \frac{1}{SR_{o-i}} + \frac{1-K_1 K_2}{K_2+1}\right)\frac{T_{R1}}{K_1} - \frac{K_2}{K_2+1} \cdot \frac{P_{pto\_e}}{\omega_d} + \varphi_{SGii}(\omega_e^* - \omega_e)$$

and to regulate power from said second electric machine to:

$$P_{E2} = -P_{E1} + P_{pto\_e}$$

where $T_{R1}$ is the input torque to the ring member of the first planetary train;

$K_1$ is the planetary ratio of the first planetary train;

$K_2$ is the planetary ratio of the second planetary train;

$SR_{o-i}$ is the speed ratio;

$\phi_{SGII}(\omega_e^* - \omega_e)$ is a feedback function of engine speed error;

$P_{E1}$ is the electrical power from said first electric machine; and $P_{pto\_e}$ is the electrical power taken off from said engine and said pair of planetary trains;

(b) at or greater than said switch point to regulate torque from said second electric machine to $$T_{E2} = \left(\frac{K_1}{K_2+1} \cdot \frac{1}{SR_{o-i}} - \frac{K_1+1}{K_2+1}\right)\frac{T_{R1}}{K_1} - \frac{1}{K_2+1} \cdot \frac{P_{pto\_e}}{\omega_d} + \varphi_{SGiii}(\omega_e^* - \omega_e)$$

the power from said first electric machine to:

$$P_{E1} = -P_{E2} + P_{pto\_e}$$

where $T_{R1}$ is the input torque to the ring member of the first planetary train;

$K_1$ is the planetary ratio of the first planetary train;

$K_2$ is the planetary ratio of the second planetary train;

$SR_{o-i}$ is the speed ratio;

$\omega_d$ is the drive shaft speed;

$\phi_{SGIII}(\omega_e^* - \omega_e)$ is a feedback function of engine speed error;

$P_{E2}$ is the electrical power from said second electric machine; and $P_{pto\_e}$ is the electrical power taken off from said engine and said pair of planetary trains.

18. The power transmission system of claim 1 wherein said power control unit is further configured to control said at least one set of torque transfer components to decouple said first and second planetary trains, to drive said first electric machine from said engine through said first planetary train to generate electric power, and to drive said drive shaft in reverse operation from said second electric machine through said second planetary train; and wherein said power control unit is further configured to regulate a flow of electric power from said first electric machine to said second electric machine.

19. The power transmission system of claim 18, wherein said first planetary train is configured to amplify a rotational speed between said output shaft of said engine and said first electric machine; and wherein said second planetary train is configured to reduce a rotational speed between said second electric machine and said drive shaft.

20. The power transmission system of claim 1 wherein said engine control unit and power control unit are configured for hybrid mode operation.

21. The power transmission system of claim 1 wherein said engine control unit and power control unit are configured for non-hybrid mode operation.

22. The power transmission system of claim 1 wherein said engine control unit and power control unit are configured for electric-only operation.

23. The power transmission system of claim 1 wherein said engine control unit and power control unit are configured for series hybrid mode operation.

24. A method for series hybrid operation in a power transmission system including an engine having an output shaft, a pair of planetary units between the engine output shaft and an output drive shaft, each planetary unit having a ring member located around a sun member, planet members located between the sun and ring members, and a carrier member coupled with the planets and providing axes about which the planet members rotate, one of the members of the first planetary unit engageable with one of the members of the second planetary unit to form a first compound member branch, another of the members of the first unit engageable with another of the members of the second planetary unit to form a second compound branch, a first electric machine coupled to the sun member of the first planetary unit, and a second electric machine coupled to the sun member of the second planetary unit, a power control unit coupled to the first and second electric machines, the method comprising:

decoupling said first and second planetary trains from each other;

configuring said first planetary train as a speed increaser;

driving said first electric machine from said engine output shaft through said first planetary train to generate electrical power;

configuring said second planetary train as a speed reducer;

delivering said electrical power from said first electric machine to said second electric machine;

driving said output drive shaft from said second electric machine through said secondary planetary train; and regulating said generation and delivery of electrical power from said first electric machine to said second electric machine to control said output drive shaft rotational speed.

25. A method for power regulation in a power transmission system including an engine having an output shaft, a pair of planetary units between the engine output shaft and an output drive shaft, each planetary unit having ring member located around a sun member, planet members located between the sun and ring members, and a carrier member coupled with the planets and providing axes about which the planet members rotate, at least one of the members of the first planetary unit engagable with one of the members of the second planetary unit to form a compound member branch, a first electric machine coupled to one member of the first planetary unit, and a second electric machine coupled to one member of the second planetary unit, a power control unit coupled to the first and second electric machines, the method comprising:

identifying the output drive shaft rotational speed and driver inputs;

calculating engine output utilizing said output drive shaft rotational speed and at least one driver input;

determining a engine operating point based on a selected performance objective;

calculating a speed ratio between said output drive shaft and said engine output shaft;

selecting an operating regime for said power transmission system based upon said calculated speed ratio;

selecting a control routine for each of said first and second electric machines based upon said calculated speed ratio;

controlling one of said electric machines to provide torque to regulate said engine rotational speed based upon said operating regime and control routines;

controlling a second of said electric machines to provide torque to balance power in said first and second planetary units based upon said operating regime and control routines; and regulating the engine to achieve a desired engine output torque based on a selected performance objective.

26. The method for power regulation of claim 25 wherein the step of selecting a control routine for each of said electric machines is responsive to said speed ratio being:

(a) at or below a first node point, to select a first set of control routines;

(b) greater than said first node to select a second set of control routines; and (c) greater than a switch point to select a third set of control routines.

27. The method for power regulation of claim 26 wherein said first set of control routines regulates torque from said first electric machine to:

$$T_{EI} = \frac{T_{RI}}{K_1} + \varphi_{SGI}(\omega_e^* - \omega_e)$$

and power from said second electric machine to:

$$P_{E2} = -P_{E1} + P_{pto\_e}$$

where $T_{R1}$ is the input torque to the ring member of the first planetary train;

$K_1$ is the planetary ratio of the first planetary train;

$\varphi_{SGI}(\omega_e^* - \omega_e)$ is a feedback function of engine speed error;

$P_{E1}$ is the electrical power from the first electric machine; and $P_{pto\_e}$ is the electrical power taken off from said engine and said pair of planetary trains.

28. The method for power regulation of claim 26 wherein said second set of control routines regulates torque from said first electric machine to:

$$T_{EI} = \left(\frac{K_1 K_2}{K_2+1} \cdot \frac{1}{SR_{o-i}} + \frac{1-K_1 K_2}{K_2+1}\right)\frac{T_{RI}}{K_1} - \frac{K_2}{K_2+1} \cdot \frac{P_{pto\_e}}{\omega_d} + \varphi_{SGii}(\omega_e^* - \omega_e)$$

and power from said second electric machine to:

$$P_{E2} = -P_{E1} + P_{pto\_e}$$

where $T_{R1}$ is the input torque to the ring member of the first planetary train;

$K_1$ is the planetary ratio of the first planetary train;

$K_2$ is the planetary ratio of the second planetary train;

$SR_{o-i}$ is the speed ratio;

$\varphi_{SGII}(\omega_e^* - \omega_e)$ is a feedback function of engine speed error;

$P_{E1}$ is the electrical power from the first electric machine; and $P_{pto\_e}$ is the electrical power taken off from said engine and said pair of planetary trains.

29. The method for power regulation of claim 26 wherein said third set of control routines regulates torque from said first electric machine to:

$$T_{E2} = \left(\frac{K_1}{K_2+1} \cdot \frac{1}{SR_{o-i}} - \frac{K_1+1}{K_2+1}\right)\frac{T_{RI}}{K_1} - \frac{1}{K_2+1} \cdot \frac{P_{pto\_e}}{\omega_d} + \varphi_{SGili}(\omega_e^* - \omega_e)$$

and power from said first electric machine to:

$$P_{E1} = -P_{E2} + P_{pto\_e}$$

where $T_{R1}$ is the input torque to the ring member of the first planetary train;

$K_1$ is the planetary ratio of the first planetary train;

$K_2$ is the planetary ratio of the second planetary train;

$SR_{o-i}$ is the speed ratio;

$\omega_d$ is the drive shaft speed;

$\varphi_{SGIII}(\omega_e^* - \omega_e)$ is a feedback function of engine speed error;

$P_{E2}$ is the electrical power from the second electric machine; and $P_{pto\_e}$ is the electrical power taken off from said engine and said pair of planetary trains.

30. The method for power regulation of claim 25 wherein the step of selecting an operating regime for said power transmission system is responsive to said calculated speed ratio being:

(a) at or below a first node point, to select an output-power split operating regime and to disengage the second compound branch members; and (b) greater than said first node point to select a compound power-split operating regime and to engage the second compound branch members.

31. The method of claim 25 for power regulation in a power transmission system wherein a low-speed hybrid operating regime is selected further including the steps of:
  decoupling said first and second planetary units;
  regulating said engine output torque to zero;
  delivering electrical power to said second electric machine from an energy storage device; and
  controlling said second electric machine to provide torque to said output drive shaft through said second planetary unit.

* * * * *